Figure 1:
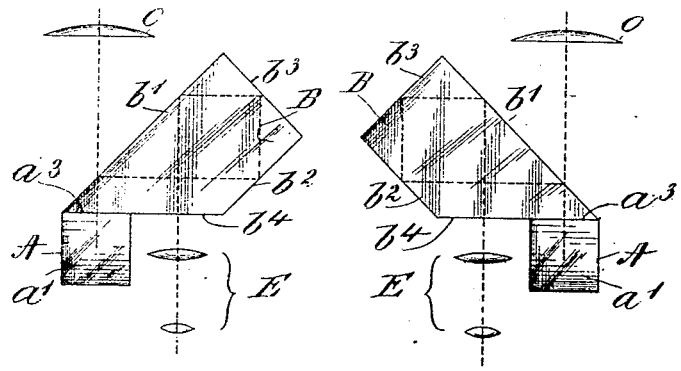

No. 869,769. PATENTED OCT. 29, 1907.
L. BELL.
TELESCOPE.
APPLICATION FILED MAR. 16, 1907.

WITNESSES:
Joseph T. Brennan
Margaret H. Danaher

INVENTOR:
Louis Bell
by Roberts & Mitchell
Attorneys

UNITED STATES PATENT OFFICE.

LOUIS BELL, OF BROOKLINE, MASSACHUSETTS.

TELESCOPE.

No. 869,769.    Specification of Letters Patent.    Patented Oct. 29, 1907.

Application filed March 16, 1907. Serial No. 362,712.

*To all whom it may concern:*

Be it known that I, LOUIS BELL, a citizen of the United States, and resident of Brookline, in the county of Norfolk and State of Massachusetts, have invented new and useful Improvements in Telescopes, of which the following is a specification.

My invention relates to the construction of telescopes of that class wherein inverting reflecting prisms are employed to enable the maker to reduce the dimensions of the telescope without sacrificing the advantages due to an ample focal length.

The object of my invention is to provide a telescope of this character having high magnifying and light gathering power for its dimensions and so proportioned and constructed that it will lose little illumination by internal reflections and eliminate liability to displacement of the optical parts.

So far as I am informed, in the telescopes heretofore manufactured belonging to this class, that is to say, having prismatic inverting systems, the Porro construction characterized by two right angled totally reflecting prisms widely separated so as to double the light ray upon itself has been almost exclusively employed. It is quite difficult to mount the optical parts of these telescopes so that they shall remain permanently in correct alinement and this difficulty is especially formidable in binocular constructions. Telescopes of the Porro type, moreover, have four air-to-glass surfaces which involve loss of light by reflection and by absorption when these surfaces become soiled and are particularly difficult to keep clean because of the inaccessibility of the surfaces of the optical parts.

In the construction of prism telescopes according to my invention, I employ a novel and improved form of inverting system which enables me in a very short telescope to use an objective of considerable focal length and consequently to obtain a high degree of magnification without resorting to a very short focus eye piece, while at the same time I require but two air-to-glass surfaces, both of which are readily accessible for cleaning. I also gain the advantage of a one-piece self-contained inverting system which is very easily kept in alinement and occupies but little axial distance along the line of sight. Should the manufacturer desire to gain additional focal length, the one-piece feature may be dispensed with and the prism-members peculiar to my invention separated, with the disadvantage, however, of having in substance four air-to-glass surfaces in the path of the optical ray.

Figure 2:
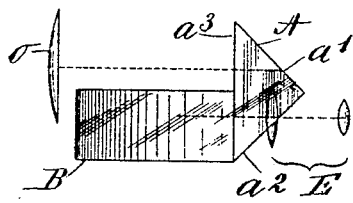
Figure 3:
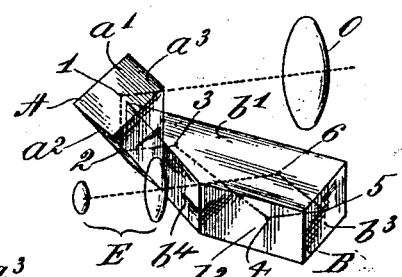
Figure 5:
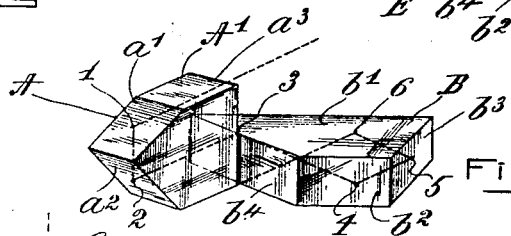
Figure 4:
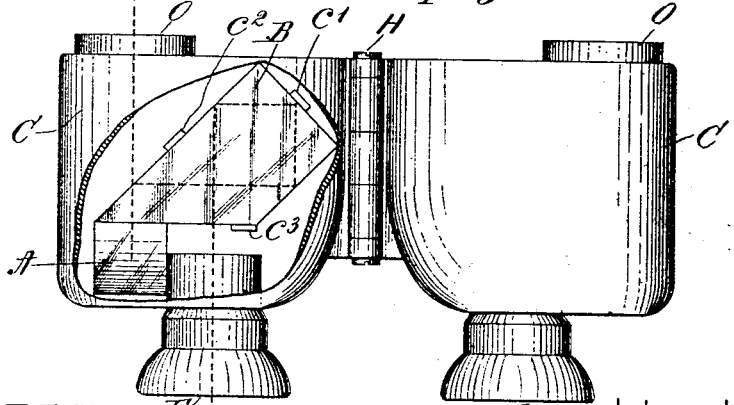

In the drawings hereto annexed which illustrate embodiments of my invention,—Figure 1 shows in plan the arrangement of the optical portions of a binocular prism telescope; Fig. 2 shows in side view one of the telescopic elements of the binocular of Fig. 1; Fig. 3 shows in perspective one of these telescoping elements; Fig. 4 is a plan view of a complete binocular wherein the case at one side is broken away to exhibit the arrangement of some of the optical parts; and Fig. 5 is a modification which also embodies my invention whereby a prism system is provided which has a longer ray-path than in the form shown in Figs. 1 to 4.

The inverting system peculiar to my invention consists in the illustrations shown of a single right angled twice totally reflecting prism such as A combined with a trapezoidal right prism as B, of which the short sides make angles of 90° and 45° respectively, with the longer sides. In my inverting system the oblique face of the trapezoidal prism and the hypotenuse face of the right angled prism are either parallel or, preferably, coincident. Whether these faces are coincident or parallel they lie in planes, geometrically speaking, between which the angle is zero.

In the form of inverting system shown in the drawings, the trapezoidal faces of the trapezoidal prism, and the triangular faces of the right angled prism, lie in planes at right angles to, each other. The two prism elements A, B are preferably formed and ground separately and then, in order to form the inverting system, are cemented together at their hypotenuse faces. Obviously, however, should the optician manufacturing such an inverting system desire to make the two prisms from a single piece of glass, grinding their effective faces so that geometrically they are the same and functionally equivalent to those of the system shown in the drawings, he may do so, but in practice it will be found highly advantageous to make the two members of the prism inverting system separately and then join them into what is practically an integral whole by cementing, because as the surfaces of these prisms should be perfectly flat, their grinding and polishing is a comparatively easy matter when they are made separately as suggested.

In Fig. 1 which shows the optical members of a binocular telescope constructed according to my invention, O is the objective, E the eye-piece and A, B the compound prism which constitutes the inverting system. As shown in perspective in Fig. 3, the ray of light indicated by the dotted line passes from the objective O through the air-to-glass face $a^3$ of the single inverting right angled prism, is reflected from the surface $a'$ at the point 1, again from the surface $a^2$ from the point 2 and passes from the prism member A into the prism member B where it is reflected from the point 3 on the surface $b'$, thence to the point 4 on the surface $b^2$ to the point 5 on the surface $b^3$, back to the surface $b'$ at point 6 and thence out to the eye-piece E through the air-to-glass face $b^4$. It is advisable, I believe, so to adjust and construct the several optical members that the image will be located just outside the air-to-glass face $b^4$ of the right trapezoidal prism. In Fig. 1 and Fig. 5 the binocular arrangement of the prisms is shown: The long sides of the two right trapezoidal prisms, in other words, the faces $b'$, converge toward each other at a right angle. The only two air-to-glass faces which lie in the path of the ray are $a^3$ and $b^4$ and should these become obscured by dust or moisture, it is only necessary to remove the objective cell and eye-piece, insert a camel's hair brush and clean these faces. By constructing the inverting prism system as above described, the ray undergoes six reflections between the two surfaces of entrance and emergence and is completely looped upon itself in the trapezoidal prism, so that a telescope of generous focal length may be contained in a very small compass. If it be not desired to cement the prism faces as shown they can readily be sealed dust proof without actual cementing.

The accessibility of the only surfaces in the inverting system which are subject to obscuration by the deposition of dust or moisture, more than compensates for the increased number of total reflections within the inverting system. The construction of prism telescopes is simplified by the use of my invention for the reason that the integral and self-contained prism systems can be accurately fixed and supported as a whole. For instance, as shown in Fig. 4, all that is required to keep the entire prism system in proper alinement, is a suitable number of lugs or studs as $c'$, $c^2$, $c^3$ which may be cast integral with or fixed to the frame plate of the binocular or other telescope while a clamping plate of the usual form (not shown) will securely hold the prism system in place.

In Fig. 4 a complete binocular containing my invention is illustrated, the same being incased in boxes C which with the usual frame plates, are hinged together as at H in order to provide for variation of interocular distance.

By utilizing the improvements above described an eight-power binocular telescope can be readily manufactured in such dimensions that it can be without difficulty carried in the pocket.

It will be observed that in the preferred form of prism system shown in Figs. 1 to 4 inclusive, several structural and operative advantages are gained. The number of air-to-glass surfaces is reduced to a minimum and the focal length possible in giving over all dimensions of the instrument is increased by the circumstance that the prism system turns the optical ray in a complete closed loop upon itself. Further, the construction of the prism system as a unit facilitates the construction and assemblage of the instrument and insures the permanence of the correct alinement of the optical parts. If it be desired however, still further to increase the focal length of the instrument, the two members A and B may be separated and separately mounted in the case as is usual in prism telescopes of the Porro type. By resorting to this mode of construction, the advantages of focal length due to the closed loop of reflection will be retained and the focal length still further increased by separation of the two members, although this involves the exposure of two air-to-glass surfaces which are more difficult of access than the air-to-glass surfaces in the instrument shown in Figs. 1 to 4 inclusive. In Fig. 5 I have indicated a mode by which this separation of the prism elements may be resorted to without, however, increasing the number of air-to-glass surfaces exposed, although the modification shown in Fig. 5 involves the interposition of an additional amount of prism substance to be traversed by the ray. In Fig. 5 the right angled twice totally reflecting prism is pentagonal in form, although in substance it is the same as the triangular prism of Figs. 1 to 4, the additional material marked $A'$ performing no function except that of enabling the constructor to eliminate air-to-glass surfaces between the two prisms.

What I claim and desire to secure by Letters Patent is:

1. The combination with an object lens of a compound prism composed of a twice totally reflecting right prism and a trapezoidal right prism.

2. The combination of a compound prism composed of a twice totally reflecting right prism, and a trapezoidal right prism, and an eye piece.

3. In a prism-telescope, the combination with object lens and eye piece, of a compound prism composed of a twice totally reflecting right prism and a trapezoidal right prism.

4. In a prism telescope, the combination with object lens and eye piece, of a compound prism composed of a twice totally reflecting right prism, and a trapezoidal right prism, whereof the entrance and emergence faces lie in planes between which the angle is zero.

5. In a prism telescope, the combination with object lens and eye piece, of a compound prism composed of a twice totally reflecting right prism, and a trapezoidal right prism, the two members of the compound prism joined as one body with the entrance face on one and the emergence face on the other lying respectively in planes between which the angle is zero.

6. In a prism-telescope, the combination with object glass and eye piece, of a compound prism composed of a right angled twice totally reflecting prism presenting a portion of its hypotenuse face to the object glass and a right trapezoidal prism whereof the prismatic faces are at angles of 45° and 90° respectively with each other, said trapezoidal prism presenting a portion of its 45° inclined face to the hypotenuse face of the right angled prism and another portion of said face to the eye piece.

7. A compound prism for prism telescopes, whereof one member is a twice totally reflecting right prism and the other member possesses four loci of reflection, whereof three turn the optical ray in a closed loop.

8. In a prism telescope, the combination with object glass and eye piece, of a right angled totally reflecting prism and a prism possessing four loci of reflection, whereof three turn the optical ray in a closed loop.

9. In a prism telescope, the combination with object glass and eye piece of a compound prism, whereof one member has two adjacent reflecting faces and the other member has three adjacent reflecting faces, whereof one has two loci of reflection coöperating with the two other reflecting faces of said member to turn the optical ray in a closed loop.

10. In a binocular prism telescope the combination of two inverting prism systems, each comprising a twice totally reflecting right prism and a trapezoidal right prism with the longest sides of said trapezoidal prisms converging at an angle of 90°.

Signed by me at Boston, Massachusetts, this twelfth day of March 1907.

LOUIS BELL.

Witnesses:
JOSEPH T. BRENNAN,
C. D. WOODBERRY.